United States Patent [19]

Rademaker

[11] Patent Number: 5,152,837
[45] Date of Patent: * Oct. 6, 1992

[54] BUILDING COMPONENT CONTAINING COAL ASH

[75] Inventor: Pieter D. Rademaker, Haarlem, Netherlands

[73] Assignee: Aardelite Holding B.V., Re Nijkerk, Netherlands

[*] Notice: The portion of the term of this patent subsequent to Apr. 16, 2008 has been disclaimed.

[21] Appl. No.: 643,754

[22] Filed: Jan. 22, 1991

Related U.S. Application Data

[62] Division of Ser. No. 365,679, Jun. 13, 1989, Pat. No. 5,002,611.

Foreign Application Priority Data

Jun. 13, 1988 [NL] Netherlands ............ 8801506

[51] Int. Cl.$^5$ ............................................. C04B 7/26
[52] U.S. Cl. ................. 106/705; 106/405; 106/707; 106/709; 106/DIG. 1
[58] Field of Search ............ 106/DIG. 1, 705, 707, 106/709, 710, 714, 405; 110/342, 344; 405/129

[56] References Cited

U.S. PATENT DOCUMENTS

| | | | |
|---|---|---|---|
| 4,624,711 | 11/1986 | Styron | 106/DIG. 1 |
| 4,741,782 | 5/1988 | Styron | 106/707 |
| 4,741,834 | 5/1988 | Spangle et al. | 106/DIG. 1 |
| 4,780,144 | 10/1988 | Loggers | 106/DIG. 1 |
| 5,002,611 | 5/1991 | Rademaker | 106/705 |

FOREIGN PATENT DOCUMENTS 222457 5/1987 European Pat. Off. .......... 106/405

Primary Examiner—Michael Lewis
Assistant Examiner—Stephen G. Kalinchak
Attorney, Agent, or Firm—Hurt, Richardson, Garner, Todd & Cadenhead

[57] ABSTRACT

Described is the process for forming a hardenable mixture of a coal ash comprising free CaO and free $CaSO_4.0 H_2O$.

In order to remove all free CaO the coal ash is mixed with a fly-ash comprising essentially no free CaO and no free $CaSO_4.0 H_2O$ and water and subsequently subjected to a heat treatment.

By removal of free CaO it is found that the strength of hardened granules formed from such ash mixture does not deteriorate as is the case from granules formed with a coal ash comprising free CaO.

Also a process for forming hardened granules and a building component formed with use of a hardenable mixture according to the invention are described.

7 Claims, No Drawings

BUILDING COMPONENT CONTAINING COAL ASH

This is a continuation of co-pending application Ser. No. 07/365,679 filed on Jun. 13, 1989, now U.S. Pat. No. 5,002,611.

BACKGROUND OF THE INVENTION

The invention relates in the first place to a process for manufacturing a hardenable mixture containing coal ash by mixing the coal ash, optionally a binder and water.

Such a procedure is known from the European Patent Application EP-A-0 222 457 of the present applicant as a phase in the manufacture of granules based on coal ash.

The granules, which are obtained in the manner described in the abovementioned publication, may, after being formed, be hardened at elevated temperature and in the presence of water vapour, as a result of which strong granules are, in general, obtained which can be used for a wide variety of purposes. Prior to the hardening, the granules may, in addition, be moulded into building components which are then subjected to a hardening operation. It has now been found that the procedure described above does not in all cases result in a hardenable mixture from which granules can be formed which, after being hardened, have adequate stability with time. If, for example, an ash is used which contains a certain quantity of free calcium oxide and anhydrous calcium sulphate, it has been found that, under certain circumstances, the granules formed from the mixture begin to exhibit crumbling after the passage of time and even fall apart to form powder.

SUMMARY OF THE INVENTION

Investigation has now shown that a solution can be provided for said problem if, when an ash containing free CaO and $CaSO_4.0 H_2O$ is used, fly ash is added which is essentially free of free CaO and $CaSO_4.0 H_2O$ and the mixture obtained is subjected to a heat treatment.

In particular, subsequent to the heat treatment, said mixture is subjected to a granulation operation to form hardenable granules.

It is now suspected that the problem, described above, of crumbling and possibly disintegration of the granules after the hardening thereof is bound up with the presence of free lime and the slow formation of hydrated calcium sulphate ($CaSO_4.2 H_2O$). If these substances are present in said form, the following reaction may occur:

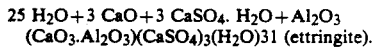
$(CaO_3.Al_2O_3)(CaSO_4)_3(H_2O)31$ (ettringite).

During the formation of ettringite, very appreciable swelling may occur, as a result of which already hardened granules may crumble and even disintegrate to form powder. Of course, the use of such an unstable product is extremely disadvantageous for the properties of the material which is formed therewith and the present invention now provides a process with which such an ash containing free CaO and $CaSO_4.0 H_2O$ can be processed. In fact, by mixing the ash with a fly ash which contains no free CaO and no $CaSO_4.0 H_2O$, the free CaO present is reacted during the heat treatment with the reactive $SiO_2$ which is, in general, present in the fly ash so that the subsequent formation of ettringite can be avoided by said reaction. To react the free CaO present in the ash with the $SiO_2$ from the fly ash, it is advantageous to subject the mixture of the ash to be processed and the fly ash to a heat treatment so that the reaction between CaO and fly ash proceeds more rapidly.

DETAILED DESCRIPTION OF THE INVENTION

In particular, the ash used and to be processed contains at least 1% by weight of free CaO and at least 1% by weight of free $CaSO_4.0 H_2O$ while the quantity of fly ash used is not less than 20% by weight of the total quantity of ash used.

The process according to the invention is advantageously used if the ash used is fluidized bed ash containing 2–15% by weight of free $CaSO_4.0 H_2O$, the quantity of fly ash used being 30–70% by weight of the total ash mixture. Preferably, the ash used contains at least 1% by weight of free CaO and at least 1% by weight of free $CaSO_4.0 H_2O$ and the quantity of fly ash used is not less than 20% by weight of the total quantity of ash used. The preferred range for the ash used is fluidized bed ash containing 2%–15% by weight of free CaO and 2%–15% by weight of free $CaSO_4.0 H_2O$ and the quantity of fly ash used is 30%–70% by weight of the total ash mixture.

In the case of the fluidized bed ash indicated above, the quantity of fly ash used is preferably 50% by weight of the total ash mixture.

Another type of ash falling within the description of an ash containing free CaO and $CaSO_4.0 H_2O$ is that which originates from the combustion of lignite or of brown coal.

The heat treatment indicated according to the invention for reacting CaO with the aid of the free $SiO_2$ from the fly ash is, in general, carried out at a temperature of not more than 90° C. for 0.2–10 hours.

The heat treatment may be carried out in the stage after mixing with fly ash and water or after fully or partially granulating such mixture.

The heat treatment in process according to the invention is advantageously continued until the quantity of detectable free CaO in the total ash mixture is less than 0.1% by weight. If the quantity of detectable free CaO is less than 0.1% by weight, hardenable granules can be obtained which, after the final hardening, exhibit an excellent stability and which can also be processed in the unhardened state to form an unhardened product which also exhibits a very good stability after hardening.

The invention also relates to a process for manufacturing hardened granules which contain ash and which is characterized in that the hardenable granules which have been obtained according to the procedure of the invention described above are allowed to harden at a temperature between 30° and 100° C., at atmospheric pressure and in a moisture-containing atmosphere. Preferably, the moisture-containing atmosphere is a steam chamber in which relative humidity exists of at least 75% relative humidity and preferably a steam chamber in which saturated steam is present.

The invention finally relates to a building component based on coal ash which has been manufactured by moulding a material containing coal ash into an unhardened building component and hardening said component at elevated temperature in an environment containing water vapour. Said building component is characterized in that the material containing coal ash is a material which has been obtained according to the process of the invention as described above to which, in connection with the moulding operation, other materials may have been added.

In a first preferred embodiment of a building component according to the invention this building component has been formed using a coal ash containing material which comprises a coal ash containing free CaO and free $CaSO_4.0\ H_2O$ which has been mixed with fly ash which is essentially free of free CaO and $CaSO_4.0\ H_2O$ and water whereafter the mixture has been subjected to a heat treatment as described before.

In another embodiment such building component has been formed with use of a coal ash containing material as described here directly before which material has been mixed with a suitable granular material in order to be moulded to an unhardened building component.

In yet another embodiment the coal ash containing material as described here before has been granulated prior to the subjecting to a heat treatment.

In still another embodiment of the building component according to the invention the granulated coal ash containing material as described in the preceding paragraph is hardened at a temperature between 30° and 100° C., at atmosperic pressure and in a moisture containing atmosphere and thereafter mixed with an appropriate hardenable mixture after which the material thus obtained is moulded into an unhardened component which is subsequently hardened.

Such an appropriate hardenable mixture may be chosen from:

1) A hardenable mixture comprising coal ash containing free CaO and free $CaSO_4.0\ H_2O$ which is mixed with fly ash which is essentially free of CaO and $CaSO_4.0\ H_2O$ and water which mixture has been given a heat treatment in order to remove substantially all free CaO.
2) Hardenable granules of the mixture of 1) described here directly above.
3) Any other hardenable mixture such as a mixture of fly ash, slaked lime and water or conventional mortar as used for producing concrete building components.

Such mixtures also may be granulated or partially granulated prior to use.

A particularly attractive embodiment of a component according to the invention uses the mixture of coal ash containing CaO and $CaSO_4.0\ H_2O$, such as for example, fluidized bed ash, and fly ash in granular form to mould it as such into an unhardened building component; prior to the granulating operation, the ash mixture has been subjected to a heat treatment.

Moulding a building component from hardenable granules which have been obtained by granulating a heat-treated ash mixture which is composed of an ash containing a free CaO and $CaSO_4.0\ H_2O$ and a fly ash which is essentially free of CaO and $CaSO_4.0\ H_2O$ and water produces a building component that, in the unhardened state, has a high degree of dimensional stability so that the building component can be moulded and can then be hardened outside a mould. The unhardened building component, for example a building block, is so rigid in structure that no breaking-off of corners or edges and the like occurs. The moulding of an unhardened building component starting from the hardenable granules which have been formed in the procedure according to the invention can be carried out in a wide variety of ways, it being possible for use also to be made, in particular, of such simple and cheap apparatuses as concrete presses. The granular material may also be placed in a mould, after which a certain compacting is achieved by vibration. After the moulding operation, the building component moulded in this way may be removed from the mould and subjected to the hardening operation.

In particular, a building component of the type described above, can be manufactured by hardening the hardenable granules used at a temperature between 30° and 100° C., at atmospheric pressure and in a moisture-containing atmosphere, after which the granules hardened in this way, are mixed, for example, with fly ash, lime and water and the hardened granules containing mixture is moulded into an unhardened building component which is then hardened in the manner described above for the granules.

The hardenable granules are composed in that case of granules which have been obtained in the procedure according to the invention, the starting point being an ash containing free CaO and $CaSO_4.0\ H_2O$, such as a fluidized bed ash, which is mixed with a fly ash which is essentially free of CaO and $CaSO_4.0\ H_2O$ in order to react the quantity of free CaO present in the fluidized bed ash with the aid of the reactive $SiO_2$ present in the fly ash. In the present procedure according to the invention, to react the quantity of CaO in, for example, fluidized bed ash, use is made of the pozzolanic properties of fly ash.

As hardenable mixture, the hardenable mixture according to the invention may also be used which is obtained by mixing ash containing CaO and $CaSO_4.0\ H_2O$, fly ash which is essentially free thereof and water, after which the total mixture obtained is subjected to a heat treatment. Any other suitable hardenable mixture, which may be of a standard type may also be used.

It is pointed out that, in the process according to the invention, the ash to be processed may optionally be mixed with a binder in order to favourably influence the strength of the granules obtained. It will be clear that, if use is made of a binder which contains an appreciable quantity of free CaO, it is advisable to increase the quantity of fly ash used accordingly in order to remove the CaO present.

The invention will now be explained with reference to an example.

A fluidized bed ash containing a composition such as is indicated under IV in Table 1, was analysed and found to contain 4% by weight CaO in the form of unbound lime. 20 kg of said ash were mixed with 4 liters of water, the mixing time being 3 minutes. The mixture was allowed to stand for 30 minutes at 72° C. in order to at least partially slake the free lime. Subsequently, the mixture was granulated using a pelletizing disc, after which the granules obtained were hardened at 90° C. in an atmosphere saturated with water vapour for 16 hours. The hardened granules formed were divided into fractions and the fractions having a diameter of 8-10 mm were examined for compressive strength. The compressive strength was found to be 26 kg. The granules were then placed under water and stored. After two weeks, the compressive strength had dropped to 21 kg, while after five weeks, the granule had completely disintegrated. The loss of compressive strength occurred both in the case of storage with the exclusion of air (i.e. under water) and also in the case of storage in air. In the case of storage in air, the strength was found to be still 5 kg after 5 weeks.

Subsequently a test was carried out in which 12 kg of the fluidized bed ash mentioned earlier (IV from Table I) was mixed with 8 kg of fly ash having a composition as is indicated in Tabel II. The mixing conditions, heat treatment and hardening conditions were identical to those of the test described above. The compressive strength of the granules having a size of 8-10 mm was 20 kg immediately after hardening. The granules were placed under water and stored. After three months, the granules were completely intact and the compressive strength had increased to 32 kg.

In the case of storage in air, the compressive strength had increased to 24 kg.

The compressive strength of granules is determined as an average by measuring the crushing load when a hardened granule of 8-10 mm diameter is placed between two flat parallel steel plates.

TABLE I

| | Ash to be processed | | | |
|---|---|---|---|---|
| | I | II | III | IV |
| $C_{tot}$ (%) | 21.8 | 13.8 | 16.6 | 16.0 |
| $CO_3$ (%) | 0.08 | 0.03 | <0.01 | 0.02 |
| $C_{org}$ (%) | 21.7 | 13.8 | 16.6 | 16.0 |
| $S_{tot}$ (%) | 4.55 | 2.86 | 2.59 | 2.18 |
| $SO_4$ (%) | 4.30 | 2.67 | 2.39 | 2.18 |
| Na (%) | 0.095 | 0.32 | 0.24 | 0.10 |
| Ca (%) | 16.4 | 11.2 | 10.5 | 11.9 |
| Si (%) | nd* | nd | 13.5 | 16.2 |
| Al (%) | nd | nd | 8.9 | 6.58 |
| Fe (%) | 4.20 | 4.70 | 4.75 | 7.3 |
| V (ppm) | 460 | 193 | 400 | 84 |
| Mo (ppm) | 22 | 23 | 20 | 13 |
| As (ppm) | 66 | 52 | 89 | 36 |

*nd — not determined

TABLE II

| | Fly ash |
|---|---|
| $C_{tot}$ (%) | 3.06 |
| $CO_3$ (%) | <0.01 |
| $C_{org}$ (%) | 3.06 |
| $S_{tot}$ (%) | 0.11 |
| $SO_4$ (%) | 0.11 |
| Na (%) | 0.16 |
| Ca (%) | 0.14 |
| Si (%) | 23.3 |
| Al (%) | 17.7 |
| Fe (%) | 3.94 |
| V (ppm) | 255 |
| Mo (ppm) | 21 |

TABLE II-continued

| | Fly ash |
|---|---|
| As (ppm) | 48 |

What is claimed is:

1. Building component based on coal ash which has been manufactured by molding a material containing coal ash into an unhardened building component and then hardening said component at elevated temperature of between 30° and 100° C. in an environment containing water vapor, wherein said hardened material containing coal has comprises a mixture of a coal ash which contains free CaO and free $CaSO_4.0\ H_2O$ and a fly ash which contains $SiO_2$ and is essentially free of free CaO and free $CaSO_4.H_2O$ and water, which mixture has been subjected to a heat treatment prior to said molding thereby preventing the subsequent formation of ettringite in said building component.

2. Building component according to claim 1, in which prior to the molding into an unhardened building component sand has been added to the material containing coal ash.

3. Building component according to claim 1, in which the material containing coal ash is hardenable granules which have been obtained by granulating the mixture of CaO and $CaSO_4.0\ H_2O$ containing coal ash; fly-ash which is free of free CaO and $CaSO_4.0\ H_2O$ and water subsequent to the heat treatment.

4. Building component according to claim 1, in which the material containing coal ash comprises a mixture of granules containing coal ash, which granules have been hardened at a temperature between 30° and 100° C., at atmospheric pressure and in a moisture containing atmosphere and a hardenable mixture, after which the mixture of granules containing coal ash and the hardenable mixture is molded into a building component and hardened; said hardenable mixture being selected from the group consisting of mixtures of fly ash, slaked lime and water, and conventional mortar.

5. Building component according to claim 1, in which said mixture of a coal ash and a fly ash comprises at least 1% by weight free CaO and at least 1% by weight free $CaSO_4.0\ H_2O$, and at least 20% by weight of said fly ash.

6. Building component according to claim 5, in which said mixture of a coal ash and a fly ash comprises between about 2%-15% by weight free CaO, about 2%-15% by weight free $CaSO_4.0\ H_2O$, and about 30%-70% by weight of said fly ash.

7. Building component according to claim 4, in which said building component is a building block.

* * * * *